United States Patent
Huibers

(10) Patent No.: US 8,531,414 B2
(45) Date of Patent: Sep. 10, 2013

(54) BUMP SUPPRESSION

(75) Inventor: Andrew G Huibers, Sunnyvale, CA (US)

(73) Assignee: Bump Technologies, Inc., Mountain View, CA (US)

( * ) Notice: Subject to any disclaimer, the term of this patent is extended or adjusted under 35 U.S.C. 154(b) by 506 days.

(21) Appl. No.: 12/730,091

(22) Filed: Mar. 23, 2010

(65) Prior Publication Data
US 2011/0187652 A1    Aug. 4, 2011

Related U.S. Application Data

(63) Continuation-in-part of application No. 12/699,692, filed on Feb. 3, 2010.

(51) Int. Cl.
| | |
|---|---|
| G09G 5/00 | (2006.01) |
| G06F 3/041 | (2006.01) |
| G06T 15/00 | (2011.01) |
| H01L 27/14 | (2006.01) |
| H04B 15/00 | (2006.01) |
| H03G 3/20 | (2006.01) |
| G01C 9/00 | (2006.01) |
| G01C 17/00 | (2006.01) |
| G01C 19/00 | (2013.01) |
| H04L 9/32 | (2006.01) |

(52) U.S. Cl.
USPC .......... 345/173; 345/156; 345/419; 257/428; 381/94.8; 381/110; 702/152; 713/168

(58) Field of Classification Search
USPC ......... 345/173, 156, 419; 257/428; 702/152; 710/303; 375/296; 381/94.8, 110
See application file for complete search history.

(56) References Cited

U.S. PATENT DOCUMENTS

| | | | | |
|---|---|---|---|---|
| 4,972,439 | A * | 11/1990 | Kuznicki et al. | 375/296 |
| 2006/0182291 | A1* | 8/2006 | Kunieda et al. | 381/110 |
| 2007/0085157 | A1* | 4/2007 | Fadell et al. | 257/428 |
| 2008/0240466 | A1* | 10/2008 | Stoutjesdijk et al. | 381/94.8 |
| 2010/0033422 | A1* | 2/2010 | Mucignat et al. | 345/156 |
| 2010/0085323 | A1* | 4/2010 | Bogue | 345/173 |
| 2010/0305899 | A1* | 12/2010 | Czompo et al. | 702/152 |
| 2011/0115784 | A1* | 5/2011 | Tartz et al. | 345/419 |
| 2011/0126009 | A1* | 5/2011 | Camp et al. | 713/168 |

OTHER PUBLICATIONS

International Search Report and Written Opinion of the International Searching Authority in PCT/US2011/0292233, Oct. 26, 2011.

* cited by examiner

Primary Examiner — Quan-Zhen Wang
Assistant Examiner — Lin Li
(74) Attorney, Agent, or Firm — NUPAT, LLC; Morrison Ulman

(57) ABSTRACT

Apparatus and methods for reducing misinterpretation of gesture-based input to portable electronic devices are described.

28 Claims, 8 Drawing Sheets

(A)

(B)

(A)

(B)

US 8,531,414 B2

BUMP SUPPRESSION

RELATED APPLICATIONS

This application is a continuation-in-part of U.S. patent application Ser. No. 12/699,692, "Bump validation", filed on 3 Feb. 2010 and incorporated herein by reference.

TECHNICAL FIELD

The disclosure is generally related to the field of gesture-based input to electronic devices.

BACKGROUND

People interact with their "smart" cell phones and other electronic devices through buttons, touch screens, microphones and other sensors. A new form of human—device interaction, sometimes called "gesture based" input, allows users to communicate their intentions by shaking, tilting or waving a device. This style of input relies on sensors such as accelerometers and gyroscopes to sense motion. Some car racing games use gyro sensors to let a user steer a car by tilting a smart phone running the game program, for example.

Recently a simple and quick way to exchange information between electronic devices was developed. When people meet, they can bump their smart phones together to rapidly exchange business cards, music playlists, digital photos, money, or other information. Thus a bump is another example of gesture based input.

Unfortunately, "smart" devices are still not smart enough to always interpret gesture based inputs correctly. Misinterpretation of gestures degrades the utility of applications that use gesture based input. A misinterpreted gesture—confusion between a tilt and a wave perhaps—is just as difficult for an application to process as an incorrect button press or distorted audio input.

Thus, what are needed are devices and methods to filter gesture based input to make it more reliable.

BRIEF DESCRIPTION OF THE DRAWINGS

FIG. 4 (*c*) shows a timeline showing an example of events processed by the filter of FIG. 4 (*b*).

FIG. 5 (*b*) shows a timeline showing an example of events processed by the filter of FIG. 5 (*a*).

FIGS. 6 (*b*) and (*c*) show timelines showing examples of events processed by the filter of FIG. 6 (*a*).

FIGS. 7 (*b*) and (*c*) are timelines showing examples of events processed by the filter of FIG. 7 (*a*).

DETAILED DESCRIPTION

When people meet, they can bump their smart phones or other devices together to rapidly exchange business cards, music playlists, digital photos, money, or other information. The act of bumping tells a device to start information transfer.

Devices may sense bumps through accelerometer measurements. If an accelerometer is too sensitive, light jiggling, jostling or other miscellaneous movement may trigger an unintended bump. On the other hand, if an accelerometer not sensitive enough, a punch or a slam may be needed to trigger a bump. It turns out that the approximate sensitivity range for comfortable bumping is also a range that is sensitive to screen touches or button presses. Thus a device may misinterpret a screen touch or a button press as a bump.

Accelerometer data and screen touch (or button press) data may be sent to a filter, implemented in hardware or software, which improves the reliability of bump gestures. One filtering strategy is based mainly on timing relationships between bumps and screen touches: bump signatures are ignored if they occur during a screen touch. Other filter strategies, based on light, proximity, gyro, heat or other sensors are also useful and may be combined with timing strategies as needed. Combining data from multiple physical sensors in a filter reduces the chance that user input to one sensor is inadvertently reported by another sensor, resulting in a misinterpreted gesture.

Figure 1:
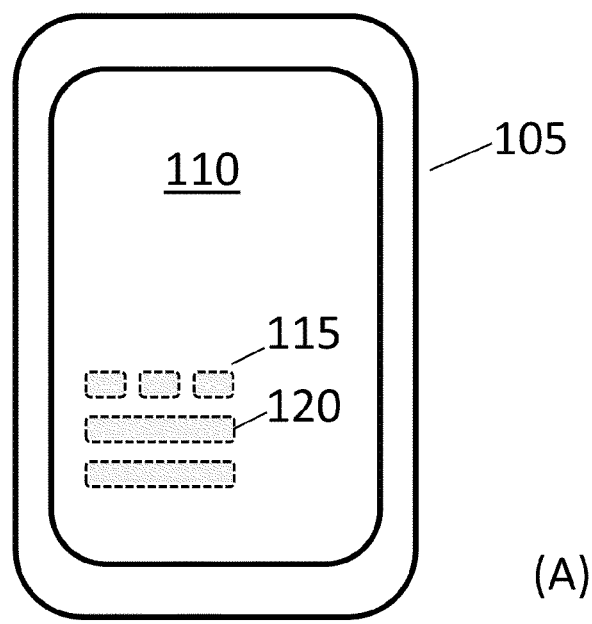
FIGS. 1A and B show examples of mobile devices having touch screens and/or buttons.
Figure 1:
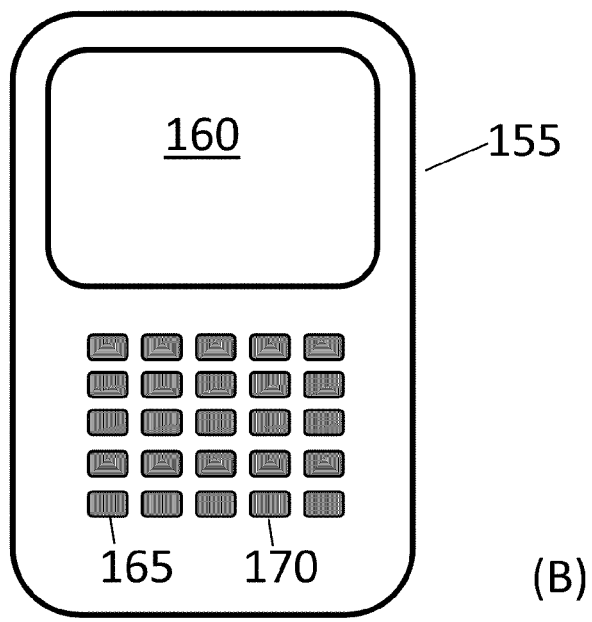

FIGS. 1 A and B show examples of mobile devices having touch screens and/or buttons. In FIG. 1A, mobile device 105 has a touch screen 110. Virtual buttons, such as 115 and 120, are displayed on the screen. In FIG. 1B, mobile device 155 has a screen 160 and physical buttons, such as 165 and 170. Of course, screen 160 may also be a touch screen capable of displaying virtual buttons and detecting screen touches, and device 105 may also incorporate physical buttons. When a button of a device such as 105 or 155 is touched (in the case of virtual buttons) or pressed (in the case of physical buttons), a touch event is created by an operating system running on a processor in the device. Touch events may indicate the beginning (touch down), end (touch up) or other aspects of a touch.

Users touch devices intentionally to enter text, point, click, drag, pinch, spread or perform other touch maneuvers. User also touch screens, buttons or other parts of devices simply as a consequence of holding them, picking them up, putting them down, etc. These touches often are not intended as inputs to applications running on the device.

Figure 2:
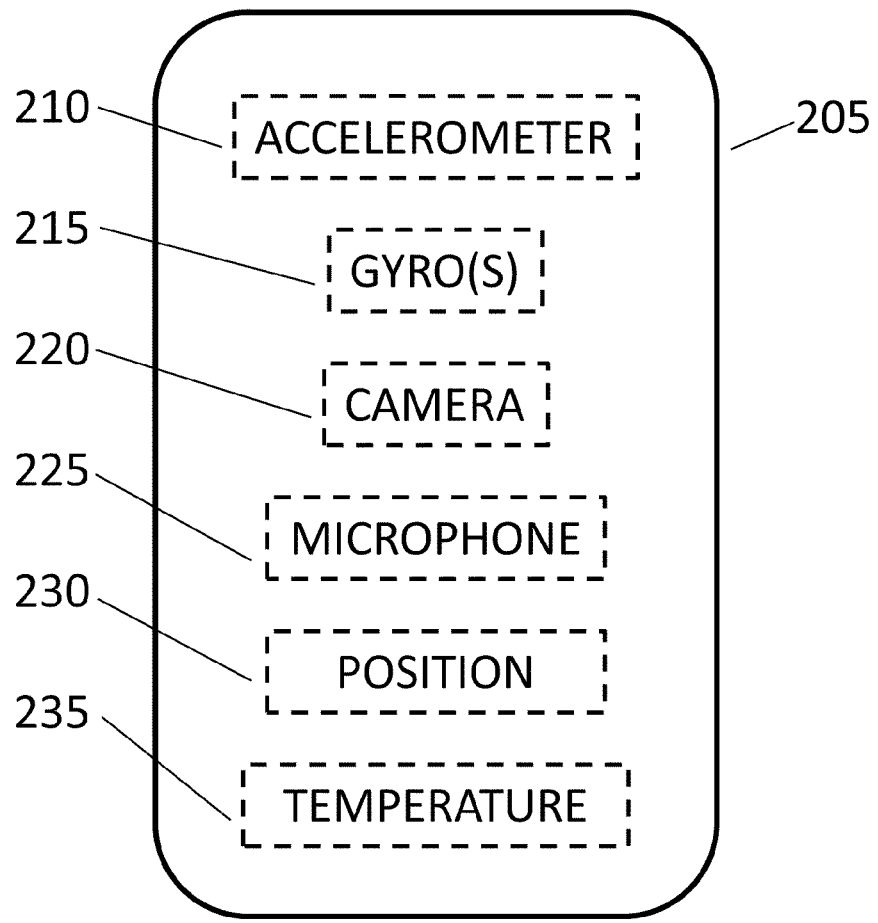
FIG. 2 shows a mobile device with various physical sensors.

FIG. 2 shows a mobile device with various physical sensors. In FIG. 2, mobile device 205 contains an accelerometer 210, one or more gyros 215, a camera 220, a microphone 225, a position sensor 230 and a temperature sensor 235. Of course a mobile device need not include all of these sensors and may include additional sensors not illustrated. Accelerometer 210 and gyros 215 may be micro-electromechanical (MEMS) devices and may provide measurements along one, two or three spatial axes. An accelerometer, for example, may provide acceleration measurements along x, y and/or z axes while a gyro may provide rate of change of pitch, roll and/or yaw. Camera 220 is a digital camera that may provide still and/or video images. Microphone 225 may be a MEMS device and may provide mono or stereo sound sensing capability. Position sensor 230 may be a global navigational satellite system (GNSS) receiver such as a GPS, GLONASS, Galileo, Compass, etc. receiver. Position sensor 230 may also incorporate cell tower triangulation and/or navigation by proximity to surveyed WiFi hotspots. Temperature sensor 235 may include a digital thermometer.

Figure 3:
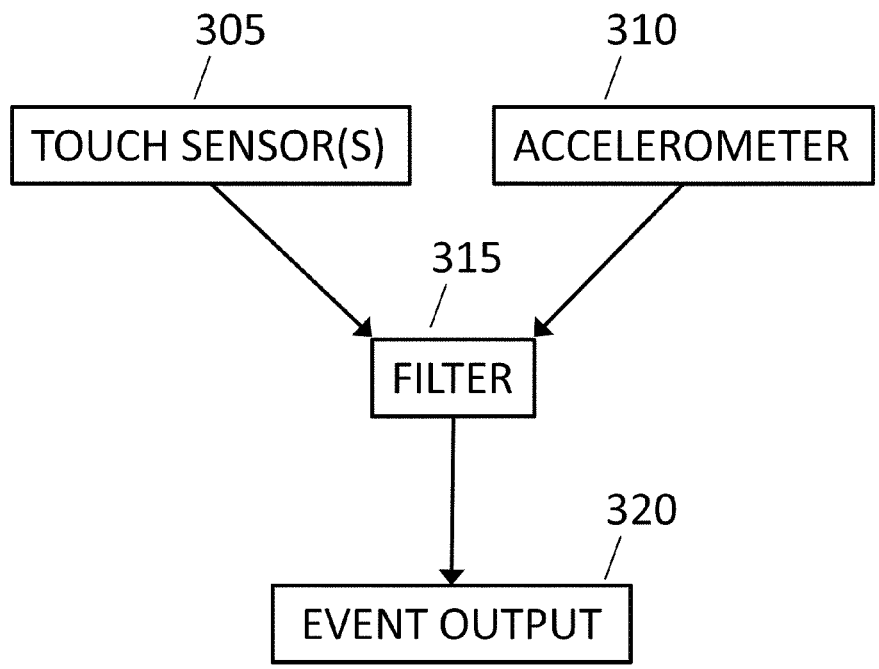
FIG. 3 is a diagram showing a touch sensor and an accelerometer connected to a filter that provides event output.

FIG. 3 is a diagram showing a touch sensor and an accelerometer connected to a filter that provides event output. In FIG. 3, touch sensor(s) 305 and accelerometer 310 send data to filter 315. The filter interprets the data and reports the occurrence of various events 320. Given streams of touch and accelerometer data, filter 315 may determine whether or not a bump event has occurred in response to a bump gesture input, or whether or not a user touch input was intentional or inadvertent. Events 320 are data that are used by applications running on a processor in a device. Filter 315 may be implemented in hardware, for example in an application specific integrated circuit, or software, for example as a process or part of a process running on a processor.

Figure 4:
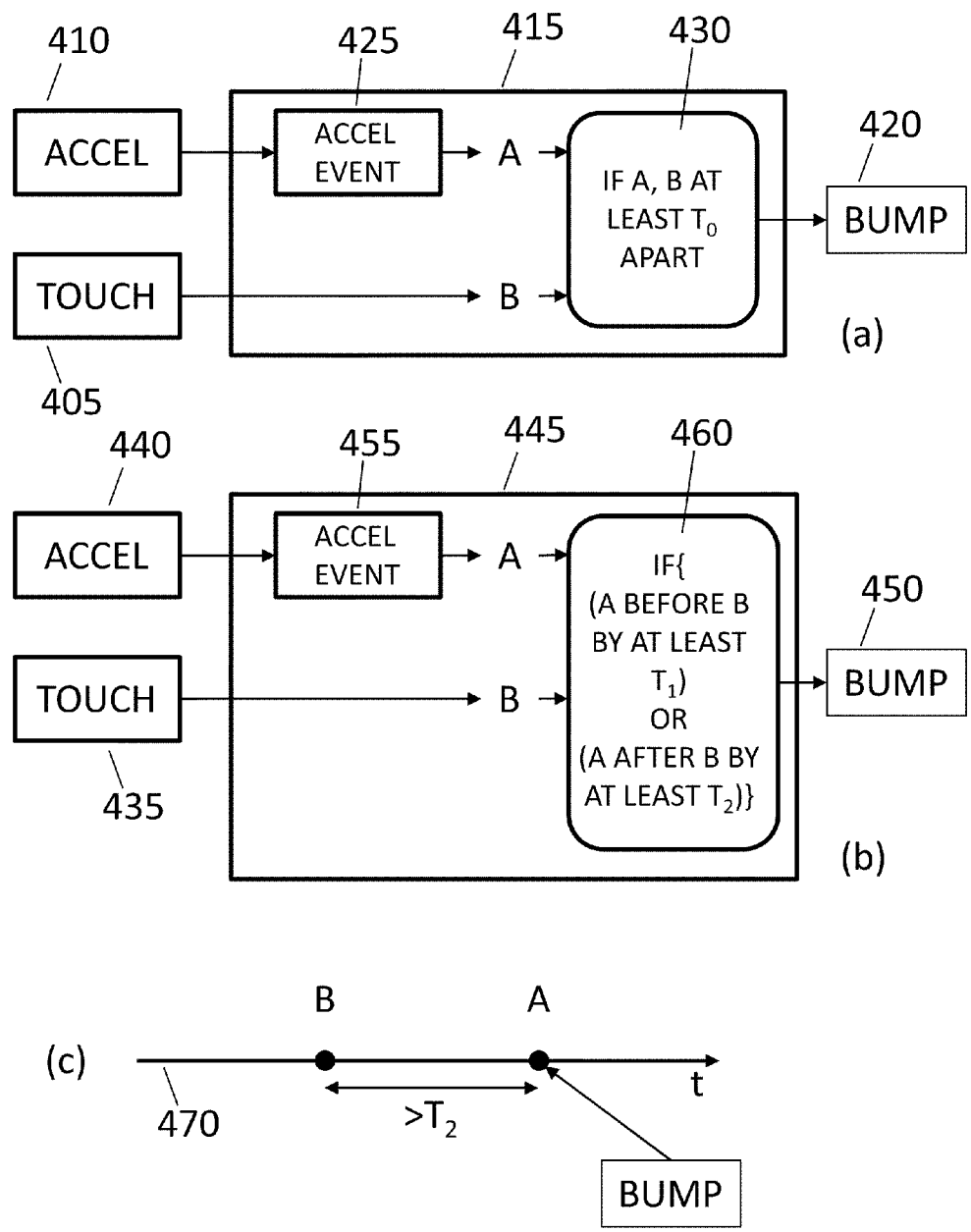
FIGS. 4 (*a*) and (*b*) show examples of event filtering.

FIGS. 4 (*a*) and (*b*) show examples of event filtering. FIG. 4 (*c*) shows a timeline showing an example of events processed by the filter of FIG. 4 (*b*). In FIG. 4 (*a*) touch sensor 405 and accelerometer 410 send data to filter 415. The output of the filter is data representing the existence of a bump event 420. Within filter 415, accelerometer event block 425 uses accelerometer data to determine the existence of accelerometer events, labeled "A". Touch data from touch sensor 405 is interpreted as touch events labeled "B" in filter 415. Decision block 430 issues digital output indicating whether or not a bump has occurred by comparing events A and B. More specifically decision block 430 declares a bump if event A occurs and events A and B are separated in time by at least time $T_0$. Said another way, accelerometer event A will be interpreted as a bump as long as no touch event occurs less than time interval $T_0$ before or after it.

In a typical device a touch sensor is tightly integrated such that the device's operating system provides notification of touch events. In contrast, an accelerometer usually provides a stream of raw accelerometer data. In today's most popular devices accelerometer readings are provided anywhere from thirty to one hundred times per second. Thus accelerometer event block 425 performs operations on raw accelerometer data to determine when accelerometer events occur.

As an example, accelerometer event block 425 might output an accelerometer event if the rate of change of acceleration (sometimes called "jerk", "jolt", "surge" or "lurch") exceeds 100 g/sec after having been less than 100 g/sec for at least 100 milliseconds. Here "g" is the acceleration due to gravity near the earth's surface. Alternatively, accelerometer event block 425 might output an accelerometer event if the rate of change of acceleration exceeds 60 g/sec after having been less than 100 g/sec for at least 250 milliseconds. The specific thresholds for rate of change of acceleration may be tuned for a particular application by observing the fraction of misinterpreted bumps. Generally, too low jerk thresholds result in an excessive number of unintended bumps while too high jerk thresholds result in failure to detect bumps that are intended by users.

The delay (e.g. "after having been less than 100 g/sec for at least 100 milliseconds") may be useful to prevent erroneous multiple reporting of bump events. Of course, other acceleration and/or delay criteria may be used.

FIG. 4 (*b*) shows a filter that is similar to that shown in FIG. 4 (*a*). In FIG. 4 (*b*) touch sensor 435 and accelerometer 440 send data to filter 445. The output of the filter is data representing the existence of a bump event 450. Within filter 445, accelerometer event block 455 uses accelerometer data to determine the existence of accelerometer events, labeled "A". Touch data from touch sensor 435 is interpreted as touch events labeled "B" in filter 445. Decision block 460 issues digital output indicating whether or not a bump has occurred by comparing events A and B. More specifically decision block 430 declares a bump if event A occurs and: (1) event A occurs at least time interval $T_1$ before event B, or (2) event A occurs at least time interval $T_2$ after event B. If time intervals $T_1$ and $T_2$ are the same, then the filter of FIG. 4 (*b*) has the same effect as that of FIG. 4 (*a*). Accelerometer event block 455 functions exactly the same as accelerometer event block 425 in FIG. 4 (*a*).

FIG. 4 (*c*) shows a timeline showing an example of events processed by the filter of FIG. 4 (*b*). Timeline 470 shows touch event "B" followed by accelerometer event "A". Event A occurs more than time interval $T_2$ later than event A. Thus events A and B meet the criteria of decision block 460 and filter 445 reports a bump coincident with event A. Of course, processing delays may introduce a short time between event A and the reporting of a bump. If event A had occurred after event B, but only by a short time, less than $T_2$, then filter 445 would not have reported a bump. Similarly, the filter does not report a bump if no accelerometer "A" event occurs.

Figure 5:
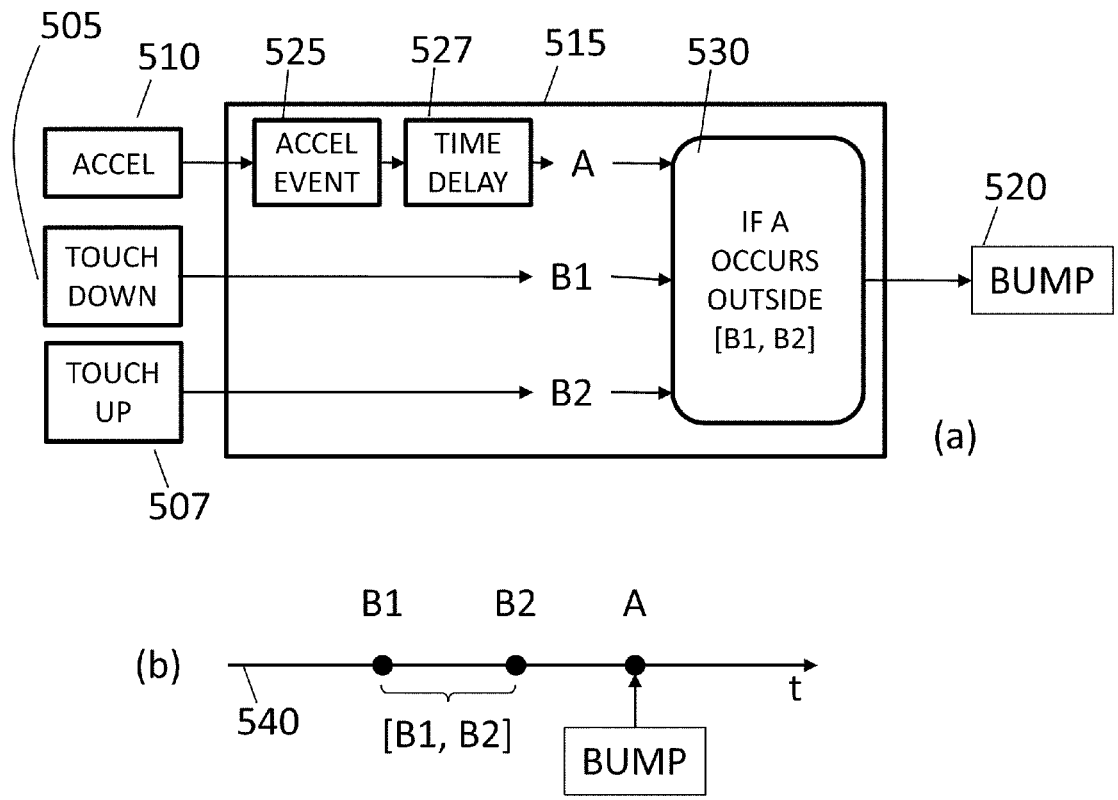
FIG. 5 (*a*) shows an example of event filtering.

FIG. 5 (*a*) shows an example of event filtering. FIG. 5 (*b*) shows a timeline showing an example of events processed by the filter of FIG. 5 (*a*). FIGS. 5 (*a*) and 4 (*b*) are similar. However, in FIG. 5 (*a*) "touch down" ("B1") and "touch up" ("B2") events are reported to a filter, rather than unspecific touch events. Touch down represents the moment that a screen touch or button press begins; touch up represents the moment that the touch or press ends. Many device operating systems report "touch down" or "touch up" events to applications. The filter illustrated in FIG. 5 (*a*) also includes a time delay block, 527.

In FIG. 5 (*a*) touch down sensor 505, touch up sensor 507, and accelerometer 510 send data to filter 515. The output of the filter is data representing the existence of a bump event 520. Within filter 515, accelerometer event block 525 uses accelerometer data to determine the existence of an accelerometer event. Accelerometer event block 525 functions exactly the same as accelerometer event block 425 in FIG. 4 (*a*). The accelerometer event is delayed by time delay block 527 before being identified as event "A". Touch down data from touch down sensor 505 is interpreted as touch events labeled "B1" in filter 515. Touch up data from touch up sensor 507 is interpreted as touch events labeled "B2" in filter 515. Decision block 530 issues digital output indicating whether or not a bump has occurred by comparing events A, B1 and B2. More specifically decision block 430 declares a bump if event A occurs and event A occurs outside the time range [B1, B2]. Time range [B1, B2] begins when event B1 occurs and ends when event B2 occurs.

FIG. 5 (*b*) shows a timeline showing an example of events processed by the filter of FIG. 5 (*a*). Timeline 540 shows touch events "B1" and "B2" followed by accelerometer event "A". Event A occurs outside the time range [B1, B2]. Thus events A, B1 and B2 meet the criteria of decision block 530 and filter 515 reports a bump coincident with event A. Of course, processing delays may introduce a short time between event A and the reporting of a bump. If event A had occurred within time interval [B1, B2], then filter 515 would not have reported a bump. Similarly, the filter does not report a bump if no accelerometer "A" event occurs.

Figure 6:
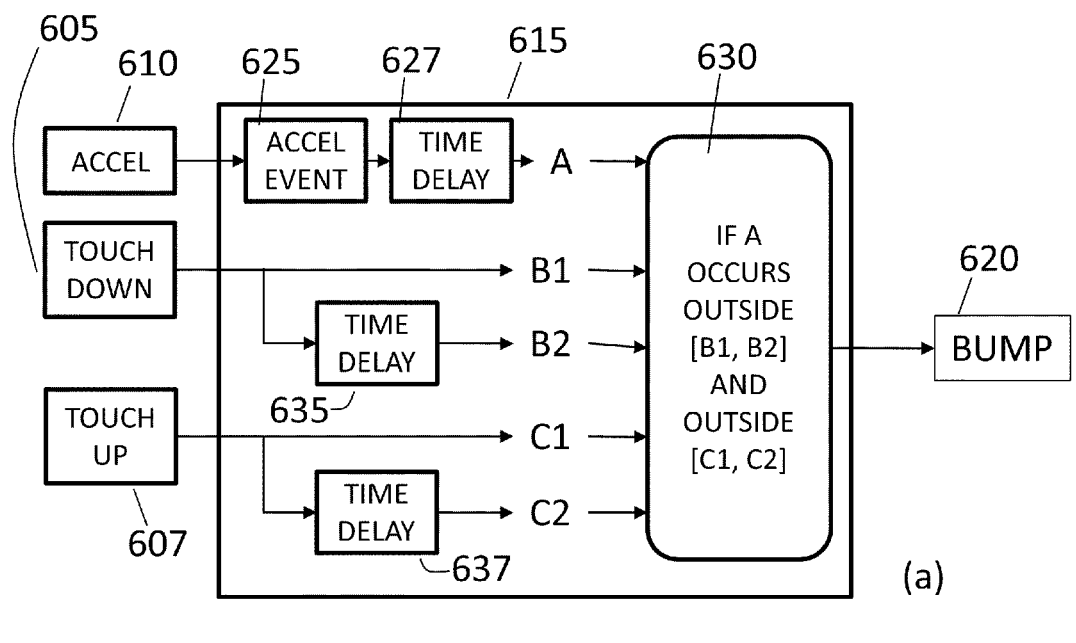
FIG. 6 (*a*) shows an example of event filtering.
Figure 6:
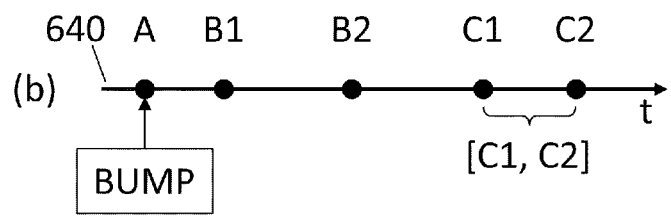
Figure 6:
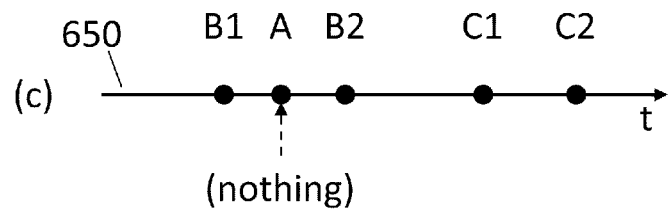

FIG. 6 (*a*) shows an example of event filtering. FIGS. 6 (*b*) and (*c*) show timelines showing examples of events processed by the filter of FIG. 6 (*a*). The filter of FIG. 6 (*a*) is similar to that of FIG. 5 (*a*); however, the filter of FIG. 6 (*a*) includes additional time delay blocks to generate delayed versions of touch down and touch up events, and different bump decision criteria.

In FIG. 6 (*a*) touch down sensor 605, touch up sensor 607, and accelerometer 610 send data to filter 615. The output of the filter is data representing the existence of a bump event 620. Within filter 615, accelerometer event block 625 uses accelerometer data to determine the existence of an accelerometer event. Accelerometer event block 625 functions exactly the same as accelerometer event block 425 in FIG. 4 (*a*). The accelerometer event is delayed by time delay block 627 before being identified as event "A". Touch down data from touch down sensor 505 is interpreted as touch events labeled "B1" in filter 615. Time delay 635 generates a time delayed copy of touch events B1; these events are labeled as events "B2" in filter 615. Touch up data from touch up sensor 607 is interpreted as touch events labeled "C1" in filter 615. Time delay 637 generates a time delayed copy of touch events C1; these events are labeled as events "C2" in filter 615. The time delays introduced by time delay blocks 627, 635 and 637 are not related to each other; they may have the same or different values.

Decision block 630 issues digital output indicating whether or not a bump has occurred by comparing events A, B1, B2, C1 and C2. More specifically decision block 630 declares a bump if event A occurs and event A occurs outside the time range [B1, B2] and event A occurs outside the time range [C1, C2]. Time range [B1, B2] begins when event B1 occurs and ends when event B2 occurs. Similarly, time range [C1, C2] begins when event C1 occurs and ends when event C2 occurs.

FIGS. 6 (*b*) and (*c*) show timelines showing examples of events processed by the filter of FIG. 6 (*a*). Timeline 640 shows a set of events that result in a bump, while timeline 650 shows a set of events that do not create a bump.

Timeline 640 shows accelerometer event "A" followed by touch events "B1" and "B2", and "C1" and "C2". Event A occurs outside the time ranges [B1, B2] and [C1, C2]. Thus events A, B1, B2, C1 and C2 meet the criteria of decision block 630 and filter 615 reports a bump coincident with event A. Of course, processing delays may introduce a short time between event A and the reporting of a bump.

Timeline 650 shows touch event "B1" followed by accelerometer event "A" and touch events "B2", "C1" and "C2". This sequence of events does not meet the criteria of decision block 630 and thus filter 615 does not report a bump. Similarly, the filter does not report a bump if no accelerometer "A" event occurs.

A bump detection system need not include an accelerometer. Bumps may be discerned from sounds detected by a microphone, for example. In a passive, sound-based bump detection system a sound event filter listens for the sound (e.g. a thud) of two devices bumping into one another. In an active, sound-based bump detection system the sound event filter listens for specific sounds emitted by another device. A device may emit a short bit sequence encoded as a stream of sounds in the normal speech audio range, for example. Sound based bump detection may operate together with, or as a substitute for, accelerometer based bump detection.

Figure 7:
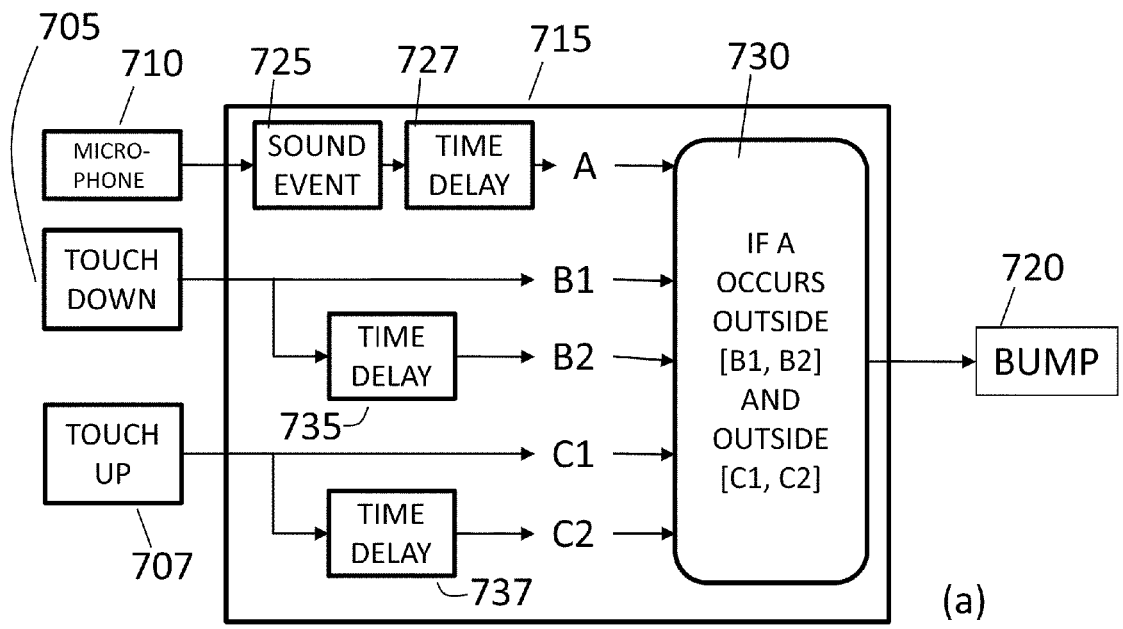
FIG. 7 (*a*) shows an example of event filtering.
Figure 7:
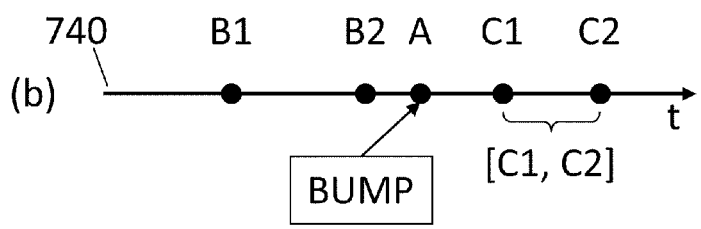
Figure 7:
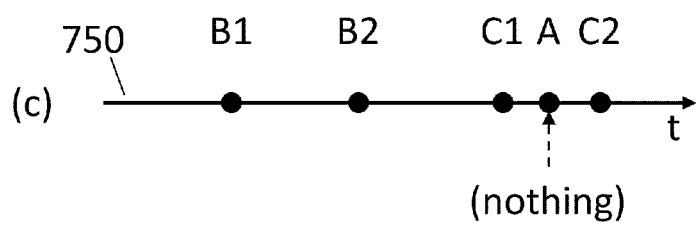

FIG. 7 (*a*) shows an example of event filtering. FIGS. 7 (*b*) and (*c*) are timelines showing examples of events processed by the filter of FIG. 7 (*a*). The filter of FIG. 7 (*a*) is similar to that of FIG. 6 (*a*); however, the filter of FIG. 7 (*a*) operates on sound events rather than accelerometer events.

In FIG. 7 (*a*) touch down sensor 705, touch up sensor 707, and microphone 710 send data to filter 715. The output of the filter is data representing the existence of a bump event 720. Within filter 715, sound event block 725 uses microphone data to determine the existence of a sound event. Sound event block 725 detects the signature of a passive or active sound event. Examples of such signatures include passive thuds having duration and frequency content that meet certain criteria, or active bit sequences encoded as sounds. The sound event is delayed by time delay block 727 before being identified as event "A". Touch down data from touch down sensor 705 is interpreted as touch events labeled "B1" in filter 715. Time delay 735 generates a time delayed copy of touch events B1; these events are labeled as events "B2" in filter 715. Touch up data from touch up sensor 707 is interpreted as touch events labeled "C1" in filter 615. Time delay 737 generates a time delayed copy of touch events C1; these events are labeled as events "C2" in filter 715. The time delays introduced by time delay blocks 727, 735 and 737 are not related to each other; they may have the same or different values.

Decision block 730 issues digital output indicating whether or not a bump has occurred by comparing events A, B1, B2, C1 and C2. More specifically decision block 730 declares a bump if event A occurs and event A occurs outside the time range [B1, B2] and event A occurs outside the time range [C1, C2]. Time range [B1, B2] begins when event B1 occurs and ends when event B2 occurs. Similarly, time range [C1, C2] begins when event C1 occurs and ends when event C2 occurs.

FIGS. 7 (*b*) and (*c*) show timelines showing examples of events processed by the filter of FIG. 7 (*a*). Timeline 740 shows a set of events that result in a bump, while timeline 750 shows a set of events that do not create a bump.

Timeline 740 shows touch events "B1" and "B2" followed by sound event "A" and touch events "C1" and "C2". Event A occurs outside the time ranges [B1, B2] and [C1, C2]. Thus events A, B1, B2, C1 and C2 meet the criteria of decision block 730 and filter 715 reports a bump coincident with event A. Of course, processing delays may introduce a short time between event A and the reporting of a bump.

Timeline 750 shows touch events "B1", "B2" and "C1" followed by sound event "A" and touch event "C2". This sequence of events does not meet the criteria of decision block 730 and thus filter 715 does not report a bump. Similarly, the filter does not report a bump if no sound "A" event occurs.

Gesture based input extends beyond accelerometer, microphone and/or touch events. Gyro, image, position, temperature and other sensors may be used for a wide variety of gestures and/or gesture filtering. For example, whether or not a device is in a pocket or purse may be inferred from still or video image data provided by a camera. Whether or not a device is motionless, and therefore unlikely to be in a person's hand, may be inferred from angle rate data provided by a gyro. Gyros (and/or accelerometers) may also detect repetitive motions associated with a walking gait. Temperature data may also imply characteristics of a device's environment, such as whether or not the device is held in a person's hand. Position and/or speed provided by GNSS, cell phone trilateration, proximity to known communication hotspots or other techniques, may be combined with other sensor inputs in filters. A rapidly moving device is unlikely to intend a bump with another device moving at a different speed. Similarly, rapid rotations are usually not intended as bumps so filters that combine gyro events, and touch and/or accelerometer events may be useful.

Thus device input based primarily on one type of physical sensor may be combined with input from other sensors in filters that improve the accuracy of sensor data interpretation. Data from one or more sensors may be provided to one or more filters simultaneously. The filters generate events which are then used by applications running on a processor.

Figure 8:
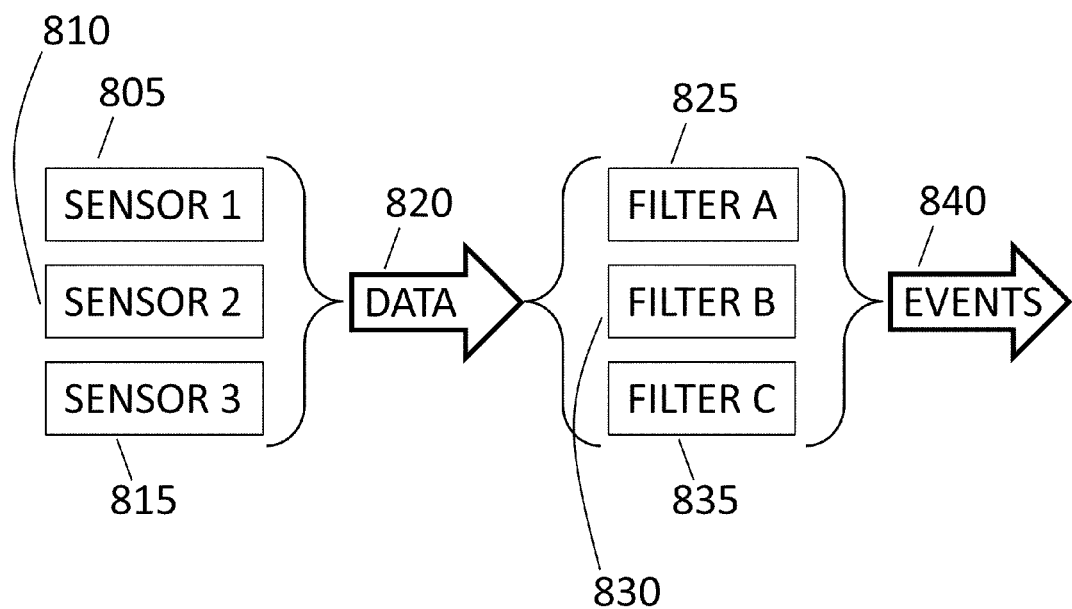
FIG. 8 shows a system for filtering data provided by multiple sensors.

FIG. 8 shows a system for filtering data provided by multiple sensors. In FIG. 8, sensors 805, 810 and 815 are physical sensors that detect acceleration, angular rate, image, sound, position, speed, temperature, vibration, proximity or other physical phenomena. The sensors generate a stream of digital data 820 representing sensor measurements. Of course, analog sensors may be combined with analog to digital converters to create digital sensor systems. Filters 825, 830, 835 are integrated circuits and/or processes running on micro processors. The filters combine data from the sensors by applying time delays, logical relationships, amplitude thresholds, Fourier transforms, image recognition, and/or other manipulations. The output of the filters is a stream of events 840 representing information implied by data 820. Although three sensors and three filters are shown in FIG. 8 a system may include any number of sensors and any number of filters.

While sensor data consists of raw measurements, events include judgments about what the measurements signify. Thus, a value of acceleration, a frequency spectrum of a sound and an average angular rate over a period of one second are examples of data, while "bump", "in-pocket" and "not-moving" are examples of events.

Combining data from multiple physical sensors in a filter reduces the chance that user input to one sensor is inadvertently reported by another sensor, resulting in a misinterpreted gesture. Such a filter thereby increases the utility of an electronic device and improves a user's overall experience with it.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A device comprising:
a touch input sensor that generates a touch event;
an accelerometer that generates accelerometer data; and,
a filter comprising:
an accelerometer event block that determines the existence of an accelerometer event based on the accelerometer data; and,
a decision block that issues digital output indicating whether or not a bump event has occurred by comparing the touch event and the accelerometer event.

2. The device of claim 1 wherein the accelerometer event block generates an accelerometer event if the accelerometer data indicates that a rate of change of acceleration exceeds a first threshold value.

3. The device of claim 1 wherein the accelerometer event block generates an accelerometer event if the accelerometer data indicates that a rate of change of acceleration exceeds a first threshold value immediately after having been less than a second threshold value for at least a predetermined amount of time.

4. The device of claim 1 wherein the decision block indicates that a bump event has occurred if an accelerometer event occurs and no touch events occur within a time $T_0$ before or after the accelerometer event.

5. The device of claim 1 wherein the decision block indicates that a bump event has occurred if an accelerometer event occurs and no touch events occur within a time $T_1$ before the accelerometer event and no touch events occur within a time $T_2$ after the accelerometer event.

6. The device of claim 1 wherein the touch input device is a touch screen.

7. The device of claim 1 wherein the touch input device is a button or keyboard.

8. A device comprising:
a touch input sensor that generates a touch down event and a touch up event;
an accelerometer that generates accelerometer data; and,
a filter comprising:
an accelerometer event block that determines the existence of an accelerometer event based on the accelerometer data;
a time delay block that delays the existence of the accelerometer event; and,
a decision block that issues digital output indicating whether or not a bump event has occurred by comparing the touch events and the delayed accelerometer event.

9. The device of claim 8 wherein the accelerometer event block generates an accelerometer event if the accelerometer data indicates that a rate of change of acceleration exceeds a first threshold value.

10. The device of claim 8 wherein the accelerometer event block generates an accelerometer event if the accelerometer data indicates that a rate of change of acceleration exceeds a first threshold value immediately after having been less than a second threshold value for at least a predetermined amount of time.

11. The device of claim 8 wherein the decision block indicates that a bump event has occurred if a delayed accelerometer event occurs outside a time range that begins when the touch down event occurs and ends when the touch up event occurs.

12. The device of claim 8 wherein the touch input device is a touch screen.

13. The device of claim 8 wherein the touch input device is a button or keyboard.

14. A device comprising:
a touch input sensor that generates a touch down event and a touch up event;
an accelerometer that generates accelerometer data; and,
a filter comprising:
an accelerometer event block that determines the existence of an accelerometer event based on the accelerometer data;
a first time delay block that delays the existence of the accelerometer event;
a second time delay block that provides a delayed copy of the touch down event;
a third time delay block that provides a delayed copy of the touch up event; and,
a decision block that issues digital output indicating whether or not a bump event has occurred by comparing the touch events, the delayed copies of the touch events and the delayed accelerometer event.

15. The device of claim 14 wherein the accelerometer event block generates an accelerometer event if the accelerometer data indicates that a rate of change of acceleration exceeds a first threshold value.

16. The device of claim 14 wherein the accelerometer event block generates an accelerometer event if the accelerometer data indicates that a rate of change of acceleration exceeds a first threshold value immediately after having been less than a second threshold value for at least a predetermined amount of time.

17. The device of claim 14 wherein the decision block indicates that a bump event has occurred if a delayed accelerometer event occurs outside both: a first time range that begins when the touch down event occurs and ends when the delayed copy of the touch down event occurs, and a second time range that begins when the touch up event occurs and ends when the delayed copy of the touch up event occurs.

18. The device of claim 14 wherein the touch input device is a touch screen.

19. The device of claim 14 wherein the touch input device is a button or keyboard.

20. A device comprising:
a touch input sensor that generates a touch down event and a touch up event;
an microphone that generates sound data; and,
a filter comprising:
a sound event block that determines the existence of a sound event based on the sound data;
a first time delay block that delays the existence of the sound event;
a second time delay block that provides a delayed copy of the touch down event;
a third time delay block that provides a delayed copy of the touch up event; and,
a decision block that issues digital output indicating whether or not a bump event has occurred by comparing the touch events, the delayed copies of the touch events and the delayed sound event.

21. The device of claim 20 wherein the sound event block generates a sound event if the sound data represent a passive thud as determined by analysis of duration and frequency content of the data.

22. The device of claim 20 wherein the sound event block generates a sound event if the sound data represent a bit sequence encoded as sounds.

23. The device of claim 20 wherein the decision block indicates that a bump event has occurred if a delayed sound event occurs outside both: a first time range that begins when the touch down event occurs and ends when the delayed copy of the touch down event occurs, and a second time range that begins when the touch up event occurs and ends when the delayed copy of the touch up event occurs.

24. The device of claim 20 wherein the touch input device is a touch screen.

25. The device of claim 20 wherein the touch input device is a button or keyboard.

26. A method comprising:
providing a mobile device having an accelerometer and a touch input device;
creating a touch down event whenever touch input commences and a delayed copy of the touch down event a first predetermined time interval later;
creating a touch up event whenever touch input commences and a delayed copy of the touch up event a second predetermined time interval later;
creating an accelerometer event based on rate of change of acceleration exceeding a predetermined threshold value and a delayed copy of the accelerometer event a third predetermined time interval later; and,
creating a bump event by comparing the comparing the touch events, the delayed copies of the touch events and the delayed accelerometer event.

27. The method of claim 26 wherein any one or more of the predetermined time intervals is zero seconds.

28. The method of claim 26 wherein comparing the touch events, the delayed copies of the touch events and the delayed accelerometer event comprises determining if the delayed accelerometer event occurs outside both: a first time range that begins when the touch down event occurs and ends when the delayed copy of the touch down event occurs, and a second time range that begins when the touch up event occurs and ends when the delayed copy of the touch up event occurs.

* * * * *